United States Patent [19]

Kitamura

[11] 4,194,227

[45] Mar. 18, 1980

[54] COMPOSITE MAGNETIC CORE ASSEMBLY HAVING AT LEAST ONE SIDE TIP FOR A MAGNETIC HEAD

[75] Inventor: Takashi Kitamura, Yokohama, Japan

[73] Assignee: Victor Company of Japan, Limited, Yokohama, Japan

[21] Appl. No.: 925,866

[22] Filed: Jul. 18, 1978

[30] Foreign Application Priority Data

Jul. 19, 1977 [JP] Japan .............................. 52-95967[U]
Feb. 8, 1978 [JP] Japan .................................. 53-13141

[51] Int. Cl.² .......................... G11B 5/22; G11B 5/42
[52] U.S. Cl. ...................................... 360/122; 29/603
[58] Field of Search ............... 360/122, 125, 126, 127; 29/603

[56] References Cited

U.S. PATENT DOCUMENTS

| | | | |
|---|---|---|---|
| 3,303,292 | 2/1967 | Bedell et al. .......................... | 360/125 |
| 3,333,066 | 7/1967 | Studley et al. ........................ | 360/122 |
| 3,598,925 | 8/1971 | Sakai et al. ........................... | 360/122 |
| 3,639,700 | 2/1972 | Shiraki et al. ......................... | 360/127 |

OTHER PUBLICATIONS

Frost et al., "Fabrication ... Mead", IBM Tech. Disc. Bull., vol. 7, No. 11, Apr. 1965, p. 993.

*Primary Examiner*—Robert S. Tupper
*Attorney, Agent, or Firm*—Lowe, King, Price & Becker

[57] ABSTRACT

A composite magnetic core assembly for a magnetic head comprises first and second substantially C-shaped portions which are symmetrically arranged with respect to each other. Each of the first and second C-shaped portions comprises a substantially L-shaped back core, a substantially oblique prism shaped head chip and at least one side plate which is made of nonmagnetic and electrically conductive material. The side plate is fixedly attached on one side of the head tip and a portion of one side of the back core for reinforcing the adhesive strength between the head tip and the back core.

9 Claims, 8 Drawing Figures

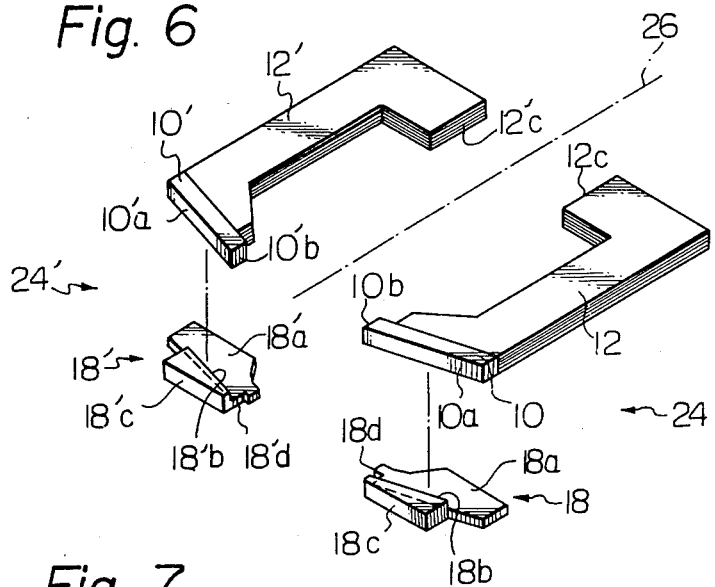
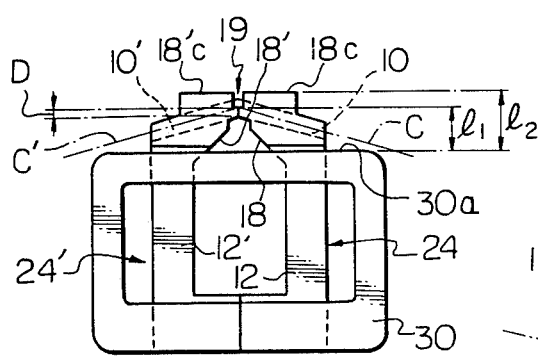
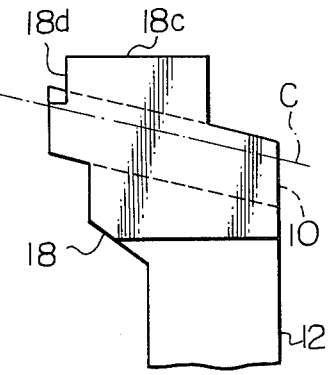

COMPOSITE MAGNETIC CORE ASSEMBLY HAVING AT LEAST ONE SIDE TIP FOR A MAGNETIC HEAD

FIELD OF THE INVENTION

This invention generally relates to a magnetic head for recording signals and onto reproducing signals from a magnetic tape. More specifically, the present invention relates to a composite type magnetic core assembly for a magnetic head.

BACKGROUND OF THE INVENTION

As is well known, a conventional composite type magnetic core assembly consists of two back cores which are usually made of laminations having a high magnetic permeability and two head tips made from wear resisting material such as Sendust (a trademark). The back cores are equipped with at least one coil. Each of the back cores usually has a substantially L-shaped portion while each of the head tips has a substantially oblique prism shape. One side of each of the head tips is fixedly connected to one end of the L-shaped portion of the back core by means of high temperature adhesion. The two head tips to each other and have a gap defined therebetween. The gap as well as the head tips are positioned so that a magnetic tape slides thereon for recording or reproducing.

The above described conventional type composite magnetic core assembly, however, has defects as will be described hereinbelow. Each of the head tips fixedly bound to the end of the back core is apt to drop from the end surface of the L-shaped portion of the back core when a tensile stress is applied to the head tip since the adhesive strength of the head chip is relatively weak against such a tensile stress. Moreover, the head tip is apt to undesirably slide from the originally bound position when a shear stress is applied to the head tip. These undesirable applications of stress to the head tips frequently occur when assembling the members of the magnetic head in the manufacturing process.

SUMMARY OF THE INVENTION

The present invention has been developed in order to overcome the above mentioned drawbacks of the conventional composite magnetic core assembly for a magnetic head. According to the present invention there is provided an improved composite magnetic core assembly for a magnetic head, comprising:

(a) first and second back cores made of laminations having a high magnetic permeability, each of the first and second back cores respectively having a substantially L-shaped portion which has first and second ends, each of the first and second ends having a substantially rectangular shape, the second ends of the first and second L-shaped portions abutting on each other via a junction; (b) first and second head tips made from wear resisting magnetic material, each of the first and second head tips having an oblique prism shape, one side of the first and second head tips being fixedly connected to the first ends of the first and second L-shaped portions respectively, a portion of the first head tip facing to a portion of the second head chip via a gap; and (c) at least first and second side plates, the first side plate being fixedly attached to one side of the first head tip and to one side of the first back core, the second side plate being fixedly attached to one side of the second head tip and to one side of the second back core.

It is therefore, an object of the present invention to provide an improved composite magnetic core assembly for a magnetic head, wherein the adhesive strength between head tips and back cores against shear and tensile stresses is reinforced.

Another object of the present invention is to provide such a magnetic core assembly in which two head tips are aligned in a predetermined level with respect to back core surfaces.

Still another object of the present invention is to provide such a magnetic core assembly in which wear of the head tips is effectively reduced.

Yet another object of the present invention is to provide such a magnetic core assembly in which dust gathering around the head gap is effectively decreased.

Still further object of the present invention is to provide such a magnetic core assembly in which leakage flux at the junctions between the head tips and back cores is effectively reduced.

BRIEF DESCRIPTION OF THE DRAWINGS

These and other objects and features of the present invention will become readily apparent from the following detailed description of the preferred embodiments taken in conjunction with the appended drawings in which:

FIG. 6 shows a perspective view of a third preferred embodiment of the magnetic core assembly according to the present invention;

FIG. 7 shows a bottom plan view of a magnetic head which consists of a whole core assembly shown in FIG. 6; and FIG. 8 shows an enlarged detailed bottom view of the magnetic head shown in FIG. 7.

DETAILED DESCRIPTION OF THE PREFERRED EMBODIMENTS

Figure 1:
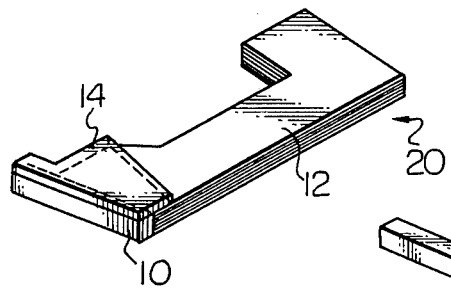
FIG. 1 shows a perspective and segmentary view of a first preferred embodiment of the magnetic core assembly according to the present invention.
Figure 3:
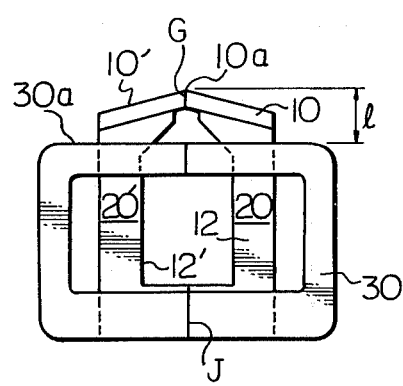
FIG. 3 shows a bottom plan view of a magnetic head which consists of a whole core assembly including the magnetic core assembly shown in FIG. 1.

FIG. 1 illustrates a perspective and segmentary view of the first preferred embodiment of the magnetic core assembly according to the present invention. FIG. 1 shows only one half of the assembly, that is to say, there is another symmetrical half portion 20', which is not shown in FIG. 1 but is shown in FIG. 3, to constitute a whole magnetic core assembly. The half portion 20 of the magnetic core assembly shown in FIG. 1 is referred to as a half core assembly 20 hereinbelow.

Figure 2:
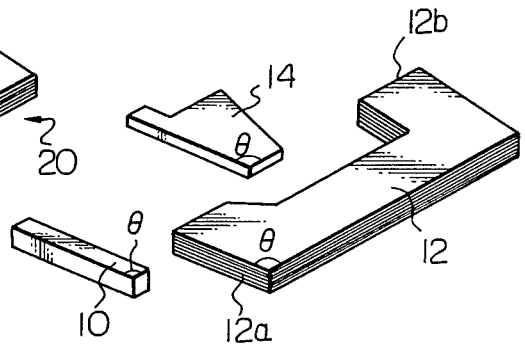
FIG. 2 shows an exploded view of the first preferred embodiment shown in FIG. 1.

The half core assembly 20 shown in FIG. 1 comprises a back core 12, a head tip 10 and a side plate 14. The relationship among these three members 10, 12 and 14 is shown in the form of an exploded view in FIG. 2. As shown in FIGS. 1 and 2 the back core 12 has a substantial L-shape, while the head tip 10 has a substantially oblique prism shape. The back core 12 is made of laminations having a high magnetic permeability. In this embodiment, permalloy is used for the laminations. The L-shaped laminations, i.e. the back core 12, has first and second ends 12a and 12b. Each of the first and second ends 12a and 12b has a substantially rectangular shape. The head tip 10 is made of a wear resisting material, such as Sendust. One side of the head tip 10 is fixedly bound to the first end 12a of the back core 12 by means of high temperature adhesion. The length of the head tip 10 is longer than the longitudinal length of the first end 12a. The side plate 14 is fixedly attached to one side surface of the head tip 10 and a portion of one side of the back core 12 so as to cover the junction therebetween. The side plate 14 is made from nonmagnetic and electrically conductive material. The hardness of the side plate 14 is preferably so hard that the hardness thereof is close to that of the head tip 10. In the preferred embodiments materials such as phosphor bronze or titanium are used for the head tips. Although in the first embodiment shown in FIG. 1 and FIG. 2 the side plate 14 is placed on the upper surfaces of the head tips 10 and the back core 12, the side plate 14 may be attached on the lower surfaces of the same. As shown in FIG. 2, one corner of the back core 12, one corner of the head tip 10 and one corner of the side plate 14 respectively have the same angle expressed in terms of $\theta$ which is slightly over 90 degrees.

With this provision the half core assembly 20 has a substantially C-shaped portion. The half core assembly 20 will be utilized for constituting a whole magnetic core assembly together with the other half core assembly 20' which is symmetrical with respect to the former.

FIG. 3 illustrates a bottom plan view of a magnetic head which comprises a whole core assembly including two half core assemblies 20 and 20' and a holder 30. The second end 12b of the back core 12 abuts on the other second end (no numeral) of the other back core 12' via a junction J. One end of the head tip 10 is facing a corresponding end of the other head tip 10' via a gap G. Since the angles of the corners of the core assemblies 20 and 20' are over 90 degrees and the head tips 10 and 10' respectively have substantial oblique prism shapes, two head tips 10 and 10' are arranged in a form of V-shape when the whole core assembly is seen in its top or bottom view. The whole core assembly is fixedly embedded in the holder 30 so that the distance l between the summit 10a of the V-shaped head tips 10 and 10' and the front edge 30a of the holder 30 is adjusted to a predetermined distance.

Figure 4:
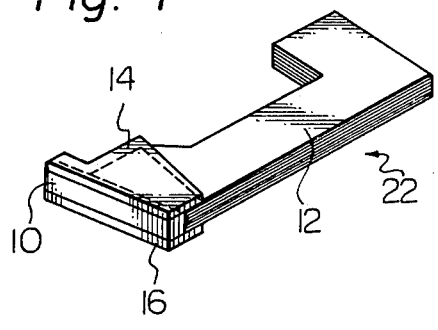
FIG. 4 shows a perspective and segmentary view of a second preferred embodiment of the magnetic core assembly according to the present invention.

Reference is now made to FIG. 4 which shows a perspective and segmentary view of the second preferred embodiment of the magnetic core assembly according to the present invention. FIG. 4 shows a half core assembly 22 in the same manner as in FIG. 1. The construction of the half core assembly 22 shown in FIG. 4 is the same as that of the first preferred embodiment except that a second side plate 16 is additionally provided. The second side plate is attached on the lower surface of the head tip 10 and on a portion of the lower surface of the back core 12 while the first side plate 14 is attached on the upper surfaces of the same. The arrangement of the half core assembly 22 shown in FIG. 4 is the same as that of the first embodiment in which the same elements are designated by the same numerals.

Figure 5:
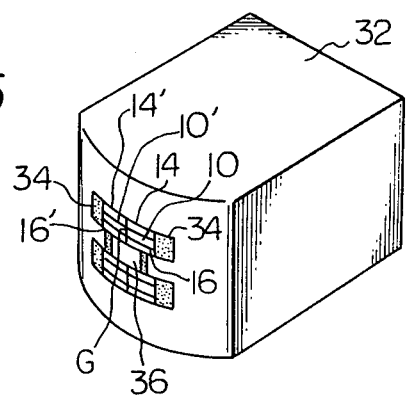
FIG. 5 shows a perspective view of a magnetic head assembly in which the half core assembly shown in FIG. 4 is utilized.

FIG. 5 illustrates a perspective view of a magnetic head assembly in which the half core assembly 22 shown in FIG. 4 is utilized. The head assembly includes two heads each of which respectively consists of two half core assemblies. The two half core assemblies are supported by a holder 30 in the same manner as shown in FIG. 3. Although no coil or winding is shown in FIG. 3, two coils are, in fact, disposed around each back cores 12 and 12'. The two heads are disposed in a casing 32 which is screening box. The casing 32 has an opening (no numeral) so that one side of each of the head tips 10 and 10' and one side of each of the side plates 14, 14', 16 and 16' are exposed while the back cores 12 and 12' are hiden by the casing 32. Therefore, only the front surfaces of the head tips 10 and 10' and side plates 14, 14', 16 and 16' are arranged to contact with a magnetic tape which slides thereon. The space between the two heads and the casing 32 is filled with synthetic resin 34. The synthetic resin 34 is provided for fixedly supporting the heads and for the prevention of entrance of dust, such as magnetic substances dropped from the magnetic tape, into the casing 32. A Sendust dummy 36 is disposed between the two heads for preventing the portion between the heads from undesirable wearing.

From the foregoing description, it will be understood that the head core assembly according to the present invention provides an improved magnetic head in which the adhesive strength against shear and tensile stresses between the head tip 10 and the back core 12 is reinforced with respect to that of the conventional type. According to experiments, it is found that the above mentioned adhesive strength has become 2.5 times as much as that of the conventional type when the binding area is three times as much as that of the junction between the head tip 10 and the back core 12 in case of the first embodiment. In case of the second embodiment in which each head tip 10 and 10' is equipped with two side plates 14 and 16 or 14' and 16', the adhesive strength has become five times as much as that of the conventional type when the binding area is five times as much as that of the junction.

In addition to the increase of the adhesive strength, since the side plate or plates 14 and 16 are disposed on at least one side of the surface of the head tip 10 and the back core 12, the side plate or plates 14 and 16 renders the alignment of the head tip 10 with the back core 12 much easier in the process of manufacturing. Further, since the side plate or plates 14 and 16 are located in the vicinity of the head gap G, one-sided wear of the resin 34 which frequently occurs due to long time use does not directly influence the head tip front surface. In other words, although the hardness of the synthetic resin 34 is much lower than that of the head tips 10 and 10', whereby one-sided wear of the synthetic resin 34 is apt to occur, since the side plate or plates 14 and 16 function as protectors of the head tips 10 and 10', one-sided wear of the head tips 10 and 10' is considerably diminished compared to the conventional type.

Moreover, since the side plate or plates 14 and 16 are made of metal, there is no pinhole which is usually inherent in synthetic resin 34. Therefore, dust such as the magnetic substances dropped from the magnetic tape seldom gathers around the head gap G. Further, since the side plate or plates 14 and 16 is made from nonmagnetic and electrically conductive material, the leakage flux at the junction between the head tip 10 and the back core 12 is effectively reduced. The reduction of the leakage flux provides improved electric characteristics of a magnetic head.

Turning back to FIG. 3, which shows a bottom view of the second embodiment of the head assembly, it is sometimes troublesome and time consuming to adjust the distance between the summit 10a of the V-shaped head tips 10 and 10' and the front edge 30a of the holder 30 to a predetermined distance. In order to adjust this distance readily, the present invention provides found a new method which will be discussed hereinbelow.

Hence, reference is now made to FIG. 6 which shows a perspective view of a third preferred embodiment of the magnetic core assembly in a manufacturing process according to the present invention. The construction of the third embodiment is basically the same as those of the previously described embodiments except that each side plate 18 and 18' has a projection 18c or 18'c and a recess 18d or 18'd. Since the construction of the core assembly shown in FIG. 6 is symmetrical with respect to a surface (not shown) including the center line 26, the description will be made hereinafter in conjunction with only the half core assembly 24. The half core assembly 24 comprises three members, viz. a back core 12, a head tip 10 and a side plate 18. The side plate 18 has a different shape from those of the first and second preferred embodiments while the back core 12 and the head tip 10 respectively have the same shapes as those of the first and second embodiments.

The side plate 18 substantially consists of two portions, i.e. a plate portion 18a and a wedge portion 18c which is projecting from the former. The plate portion 18a of the side plate 18 has an L-shaped recess 18d at the front corner thereof. The plate portion 18a and the wedge portion 18c may be integrally produced. However, these two members 18a and 18c may be separately manufactured so as to be attached to each other. The top surface of the plate portion 18a of the side plate 18 is fixedly attached to the lower surface of the head tip 10 and to a portion of the lower surface of the back core 12.

FIG. 7 illustrates a bottom view of the head assembly which includes the two half core assemblies 24 and 24' shown in FIG. 6. The back cores 12 and 12' are supported by the holder 30 in the same manner as in the first and second embodiments. Since each of the plate portions 18a and 18'a of the side plates 18 and 18' has an L-shaped recess 18d and 18'd, the wedge portions 18c and 18'c have a space 19 therebetween. Each of the wedge portions 18c and 18'c has a substantially pyramind or a triangular prism shape (strictly speaking a portion thereof is truncated) such that the front surfaces of the same are aligned in the same line when the back surfaces 18b and 18'b of the wedge portions 18c and 18'c are respectively attached to the front surfaces 10a and 10'a of the head tips 10 and 10'. It is to be noted that the head assembly shown in FIG. 7 is not a completed one, that is to say that the head assembly has two wedge portions 18c and 18'c are not part of the completed head assembly. The purpose of providing the two wedge portions 18c and 18'c is to simplify the adjustment of the distance 11 between the summit 10a of the V-shaped arrangement of the head tips 10 and 10' and the front edge 30a of the holder 30. In other words, the purpose of the wedge portions 18c and 18'c is to provide a parallel line along the front sides thereof with respect to the front edge 30a of the holder 30 so that the distance 11 between the summit 10a of the V-shaped arrangement of the head tips 10 and 10' and the front edge 30a of the holder 30 is easily measured and determined since the distance 12 between the front sides of the wedge portions 18c and 18'c and the front edge 30a of the holder 30 is readily measured.

For producing a finally completed head assembly, the wedge portions 18c and 18'c will be planed off, after the magnetic core assembly is disposed on the holder 30 by means of a grinder as far as the dot-dash lines C and C' so that not only the entire wedge portions 18c and 18'c but also portions of the head tips 10 and 10' are partially planed off. The dot-dash line C and the other dot-dash line C' are respectively parallel with the front sides 10a and 10'a of the head tips 10 and 10'. The distance between the front side 10a of the head tip 10 and the dot-dash line C is so determined that the portion of the head chip 10 which is not covered by the side plate 18 due to the recess 18d is planed off. However, it is possible to plane off only the entire wedge portions 18c and 18'c while the plate portions 18a and 18'a and head tips 10 and 10' are left as they are.

FIG. 8 shows an enlarged detailed bottom view of the third embodiment shown in FIG. 7. Although in the third embodiment the side plate 18 is provided with a L-shaped reces 18d, such as recess is not essential. The recess 18d is provided for obtaining a space 19 between the edges of the side plates 18 and 18' at their front portions to enable the operator of the grinder is able to see the head tips 10 and 10' through the space 19 when grinding or planing off the front portions of the side plates 18 and 18'. In other words, a desired depth D of the head gap G is readily obtained between the head tips 10 and 10'.

From the foregoing, it will be understood that according to the method of manufacturing the head assembly, positions of the members as well as the distances between the members are easily determined. Consequently, the head assembly is manufactured with high accuracy and with a short period of time.

While the described embodiments represents the preferred form of the present invention, it is to be understood that modifications will occur to those skilled in the art without departing from the spirit of the invention. The scope of the invention is therefore to be determined solely by the appended claims.

What is claimed is:

1. A composite magnetic core assembly for a magnetic head, comprising:
   (a) first and second back cores having a high magnetic permeability, each of said first and second back cores respectively having a substantially L-shaped portion which has first and second ends, each of said first and second ends having a substantially rectangular shape, said second ends of said first and second L-shaped portions abutting on each other;
   (b) first and second head tips made from wear resisting magnetic material, each of said first and second head tips having an oblique prism shape, one side of said first and second head tips being fixedly connected to said first ends of said first and second L-shaped portions respectively, a portion of said first head tip facing a portion of said second head tip to form a transducing gap; and
   (c) at least first and second side plates, said first side plate being fixedly attached to one side of said first head tip and to one side of said first back core, said second side plate being fixedly attached to one side of said second head tip and to one side of said second back core.

2. A composite magnetic core assembly as claimed in claim 1, wherein said first and second side plates are made from a nonmagnetic and electrically conductive material.

3. A composite magnetic core assembly as claimed in claim 1, wherein the area of one side of each of said first and second side plates is more than three times the area of the junction between the head tip and the back core.

4. A composite magnetic core assembly as claimed in claim 1, wherein each of said first and second side plates has a such that the side plate entirely covers one side surface of the head tip.

5. A composite magnetic core assembly as claimed in claim 1, wherein each of said head tip and back core is sandwiched by two side plates.

6. A composite magnetic core assembly as claimed in claim 1, wherein each of said first and second side plates comprises a projection whose front edge portion has a predetermined angle with respect to the head tip, said projection being planed off after said composite magnetic core assembly is disposed on a holder.

7. A composite magnetic core assembly as claimed in claim 6, wherein said projection has substantially a pyramid shape.

8. A composite magnetic core assembly as claimed in claim 6, wherein said projection has substantially a triangular prism shape.

9. A composite magnetic core assembly as claimed in claim 6, wherein each of said first and second side plates comprises a recess at the front corner thereof.

* * * * *